United States Patent [19]

Kluemper

[11] Patent Number: 5,421,684

[45] Date of Patent: Jun. 6, 1995

[54] VIBRATION DAMPING STRUCTURE IN A BOLTED ASSEMBLY

[75] Inventor: Scott T. Kluemper, Greenwood, Ind.

[73] Assignee: General Motors Corporation, Detroit, Mich.

[21] Appl. No.: 224,458

[22] Filed: Apr. 7, 1994

[51] Int. Cl.$^6$ .................. F16B 35/00; F16B 35/04
[52] U.S. Cl. .................. 411/392; 411/399; 411/424; 403/408.1
[58] Field of Search ............... 411/392, 411, 424, 399, 411/916, 917; 403/408.1

[56] References Cited

U.S. PATENT DOCUMENTS

| 2,008,229 | 7/1935 | Sharp | 411/424 |
| 2,371,614 | 3/1945 | Graves | 411/916 X |
| 4,941,337 | 7/1990 | Emery | 411/392 X |

FOREIGN PATENT DOCUMENTS

| 144503 | 6/1985 | European Pat. Off. | 411/399 |
| 2143784 | 3/1973 | Germany | 411/424 |

Primary Examiner—Neill R. Wilson
Attorney, Agent, or Firm—Donald F. Scherer

[57] ABSTRACT

An assembly of housings is secured is secured together by a plurality of bolt members. The assembly is subject to a source of vibration, such as an internal combustion engine. To ensure the natural frequency of the bolt is outside the operating range of the engine, tolerance support rings are installed to reduce the effective length of the bolts and thereby increase the natural frequency.

2 Claims, 1 Drawing Sheet

1

VIBRATION DAMPING STRUCTURE IN A BOLTED ASSEMBLY

TECHNICAL FIELD

This invention relates to bolted assemblies, and more particularly, to vibration damping structures associated with the bolted assemblies.

BACKGROUND OF THE INVENTION

Assemblies, wherein two or more housings are secured together by bolts and subjected through a dynamic input force, such as the vibration from an engine, require that the bolts be designed, such that the natural frequency thereof is outside the operating range of the dynamic force source.

As a general rule, the designer will provide attaching structures to the housings which will permit the use of shorter bolts to thereby increase the natural frequency of each bolt. In multiple housing assemblies, it often becomes necessary to bolt one housing to another before bolting the combined housings to a final assembly. This, of course, requires more fasteners than is otherwise necessary, and it also requires providing the space to allow the bolts to be utilized. This creates some problems when the same base housing is used in different assemblies, wherein longer bolts are required to complete the assembly.

SUMMARY OF THE INVENTION

When a long bolt is used to secure two or more housings together, it has been found that judicious placement of a tolerance ring on the bolt shaft will control or otherwise effect the natural frequency of the bolt. The natural frequency can be changed, such that it will be outside of the normal range of frequencies generated on the housing during operation. In applications where a diesel engine is used, it will generally be adequate to cause the natural frequency to be above 4000 Hertz. One or more tolerance rings are brazed to the bolt at appropriate distances from the head end to control the natural frequency of the bolt at a value above the operating range of the system.

It is therefore an object of this invention to provide an improved threaded fastener member for a housing assembly, wherein a tolerance ring is incorporated along the length of the fastener to increase the natural frequency of the fastener.

It is another object of this invention to provide an improved housing assembly in which threaded fasteners are utilized to assembly the housings, and wherein the natural frequency of the fitted fastener is controlled by the addition of material to a shank portion of the fastener.

These and other objects and advantages of the present invention will be more apparent from the following description and drawings.

DESCRIPTION OF THE PREFERRED EMBODIMENT

Figure 1:
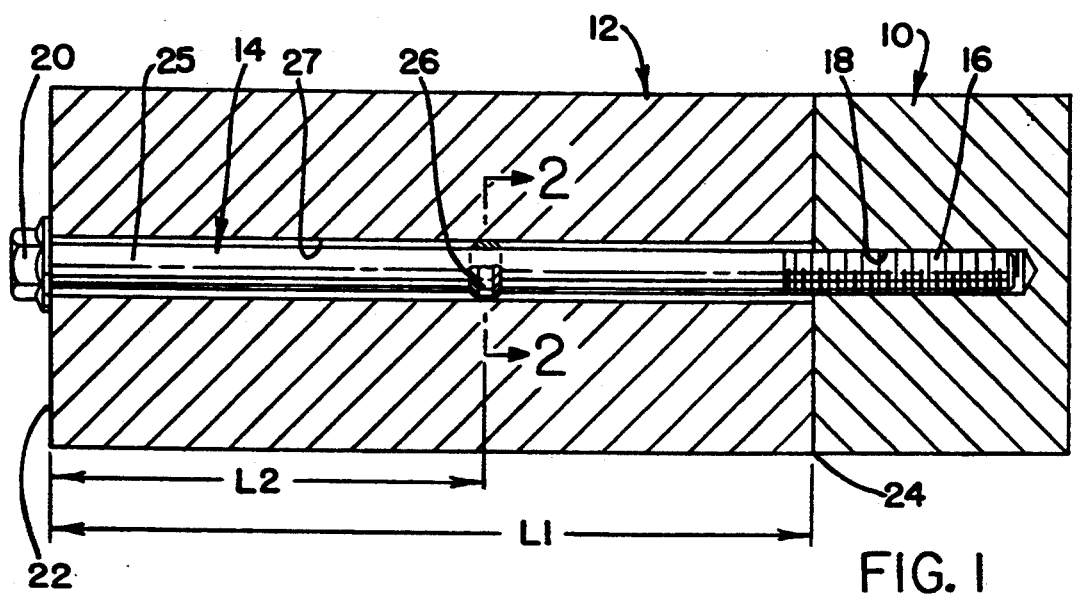
FIG. 1 is a diagrammatic representation of an assembly incorporating the present invention.

Referring to the drawings, wherein like characters represent the same or corresponding parts throughout the several views, there is seen in FIG. 1 an assembly of housings 10 and 12 which are secured together by a bolt 14. The bolt 14 has a threaded end 16 threadably secured in a threaded passage 18 formed in the housing 10, and a bolt head 20 which abuts a surface 22 on the housing 12. The bolt is effective to hold the housings 10 and 12 together. The bolt 14 has an effective length L1 which is equal to the distance from surface 22 to an interface 24 where the housings 10 and 12 are in abutment. The bolt 14 has a body portion 25 disposed in a bore 27 formed in the housing 12.

Figure 2:
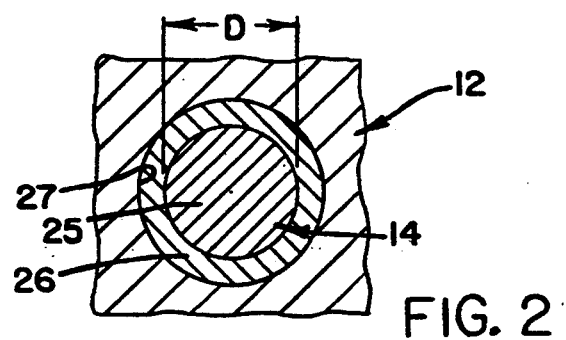
FIG. 2 is a view taken along line 2—2 of FIG. 1.

If the housing assembly 10 and 12 is subjected to a dynamic load, such as that which might attend the operation of an engine, the length L1 of the bolt 14 may cause the natural frequency of the bolt to be within the operating spectrum of the dynamic load source. As is well known, the natural frequency of a bolt is a function of the square root of Young's modulus for the material of the bolt, the moment of inertia of the bolt cross section, the density per unit length, and the fourth power of the length of the bolt. Also, an empirical value is utilized depending upon the end conditions of the bolt assembly. The inertia of the bolt is a function of the diameter D of the bolt, as shown in FIG. 2.

If the natural frequency of the bolt is within the operating frequency of the system, a tolerance ring 26 can be brazed to the outer diameter D of the bolt 14 at a location L2 from the head 20 of bolt 14 in accordance with the teaching of the present invention. The natural frequency of the bolt will be increased by the addition of the tolerance ring 26 to the body 25. If this increase is sufficient to place the natural frequency outside of the operating range, only the one tolerance ring 26 will be required. It is possible within some systems that two or more tolerance rings 26 will need to be spaced along the length L1 of the bolt 14 to establish a useful natural frequency. The natural frequency of the bolt is inversely proportional to the fourth power of the bolt length, such that if L2 is equal to one-half of L1, a natural frequency will increase by a factor of four. The tolerance rings are dimensioned diametrically to fit snugly in the bore 27.

Figure 3:
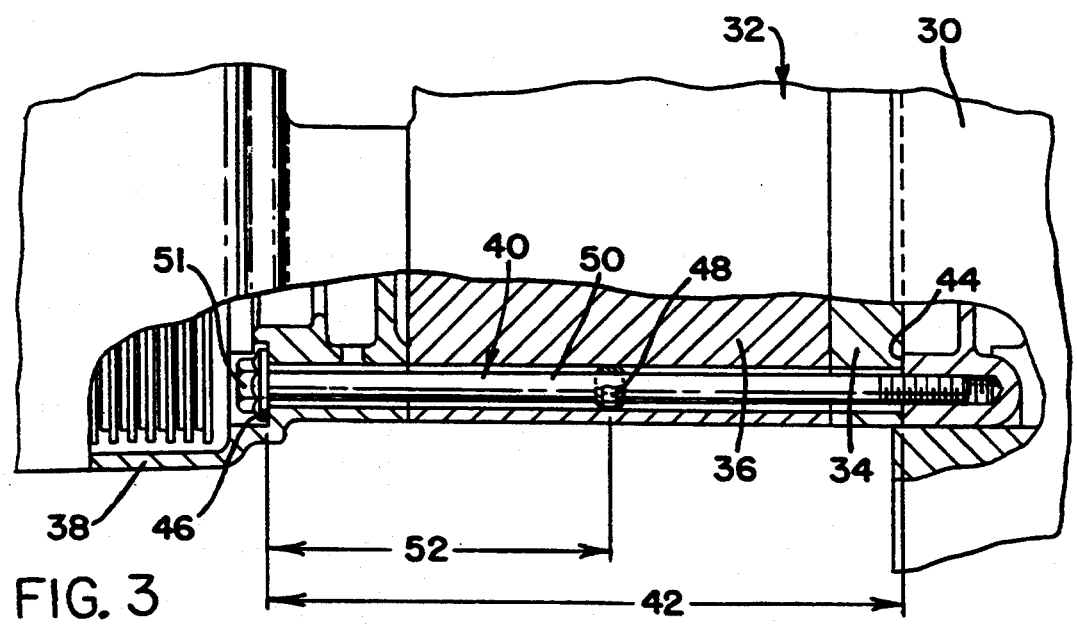
FIG. 3 is a partial cross-sectional elevational view of a multi-housing assembly utilizing the present invention.

FIG. 3 depicts a transmission assembly, wherein a transmission housing 30 has secured thereto a hydraulic retarder assembly 32 comprised of a retarder base 34 and a retarder housing 36. Also secured to the transmission housing 30 is a cooler housing 38 which is utilized to provide cooling for the hydraulic retarder 32. The cooler housing 38, retarder housing 36, retarder base 34 and transmission housing 30 are secured together by a bolt 40. The bolt 40 has an overall length of, designated 42, which is effectively the length from a face 44 of the transmission housing 30, and a mounting pad 46 in the cooler housing 38.

The hydraulic retarder 32 is operated to provide a braking or retarding function for a vehicle when downhill operation is undertaken. The retarder may be used at any time to slow the vehicle, however, it has been found most useful in downhill operation to relieve the load on the vehicle service brakes.

The assembly of the hydraulic retarder 32, cooler 38 and transmission housing 30 are, of course, subjected to dynamic loads from both the engine and from the retarder. These dynamic loads operate through a frequency range with a diesel engine of approximately zero to 3000 Hertz. In some instances, the length 42 of the bolt 40 will be of a value which will place the natural frequency of the bolt well within the operating spectrum of the system.

In one particular system, the length 42 of the bolt 40 is equal to 8.1 inches and the diameter of the bolt 40 is equal to 0.389 inches. The bolt is made of steel having a modulus of elasticity or Young's modulus of $29 \times 10^6$ and a density per unit length of $8.71 > 10^{-5}$ slugs. The end conditions of the bolt, that is, one end fixed in the thread and the other end secured against a flat surface, will have a end value of 3.57 which is determined empirically from well known tests. This particular bolt would have a natural frequency of 1052 Hertz. This is well within the operating spectrum of the system.

A tolerance ring 48 is secured, preferably by a brazing operation, to a body 50 of the bolt 40 at a distance 52 from a bolt head 51. In the particular system being discussed, the distance 52 is equal to 4.15 inches. With the addition of the tolerance ring 48, which causes the bolt 40 to fit snugly within a bore 54 of the housing 36, the length of the bolt 40 is effectively divided into the length 52 and the difference between the lengths 52 and 42. The length 52 being slightly longer will determine the lower natural frequency of the system. When the bolt has an effective length of 4.15 inches, the natural frequency is determined to be 4010 Hertz. This is well outside of the operating spectrum of the system and therefore improves the overall life of the bolt during vehicle operation.

In the particular system shown in FIG. 3, there are six of the bolts 40 used to secure the cooler housing 38 and retarder 32 to the transmission housing 30. Each of these bolts would have a tolerance ring 48 positioned at approximately the distance 52 or 4.1 inches from the bolt head 51.

While the system shown includes the cooler housing 38, as well as the retarder 32, this may not always be required. In other words, in some installations, a remote cooler may be used to cool the retarder 32, such that the cooler housing 38 can be eliminated. With this assembly, a shorter bolt 40 would be utilized and a separate natural frequency would have to be determined for that particular bolt. If the natural frequency of that bolt was also within the operating spectrum of the vehicle or the engine, the bolt could be effectively shortened by utilizing a tolerance ring at a predetermined location on the shorter bolt. Thus, the system, whether it is two housings or three housings or more, can utilize a simple through bolt assembly, such that standard bolt members will be utilized during assembly of the housings. The only change would be the overall length of the bolt and precision fitting will not have to be made between the bolt and any one of the housings.

The tolerance ring is brazed, as previously mentioned, to the bolt body 50 and can be positioned anywhere along the bolt body that is determined to be effective. The outer diameter of the tolerance ring is sized to fit snugly with the housing in which the bolt will be positioned. Thus, the bolt is a standard item and the tolerance ring is a substantially standard item and therefore additional or intricate machining is not required to provide the proper fitting of the bolt within the housings in an effort to reduce the natural frequency of the system.

The embodiments of the invention in which an exclusive property or privilege is claimed are defined as follows:

1. In combination:
   a first housing;
   a second housing;
   a bolt passage in one of said housings having a predetermined diameter;
   bolt means for securing said first and second housings together at an interface and said bolt means including a head end, a threaded end and a cylindrical portion having a single continuous predetermined outer diameter less than the bolt passage predetermined diameter between said ends and being partially disposed in said bolt passage; and
   tolerance ring means disposed between the bolt passage predetermined diameter and the cylindrical portion and secured at a location on the bolt passage at a predetermined distance from the interface for supporting the bolt and affecting the natural frequency thereof.

2. In combination:
   a plurality of housing means;
   a vibrating source imposing a range of frequencies on said housing means;
   bolt passages in said housing means having predetermined diameters;
   bolt means for securing said housing means together at an interface and said bolt means including a cylindrical portion having a single continuous predetermined outer diameter less than the bolt passages predetermined diameters and being partially disposed in said bolt passages; and
   tolerance ring means disposed between at least one of the bolt passage's predetermined diameters and the cylindrical portion and secured at a location on the bolt at a predetermined distance from the interface for supporting the bolt and affecting the natural frequency thereof to be greater than the range of frequencies imposed on the housing means.

* * * * *